United States Patent
Weissman

(10) Patent No.: US 7,085,530 B2
(45) Date of Patent: Aug. 1, 2006

(54) DYNAMIC CAPACITY ALLOCATION OF IN-BUILDING SYSTEM

(75) Inventor: Haim Weissman, Haifa (IL)

(73) Assignee: QUALCOMM, Incorporated, San Diego, CA (US)

( * ) Notice: Subject to any disclaimer, the term of this patent is extended or adjusted under 35 U.S.C. 154(b) by 119 days.

(21) Appl. No.: 09/775,894

(22) Filed: Feb. 1, 2001

(65) Prior Publication Data

US 2002/0103001 A1 Aug. 1, 2002

(51) Int. Cl.
*H04B 7/00* (2006.01)

(52) U.S. Cl. .......................... 455/7; 455/15; 455/561; 455/524

(58) Field of Classification Search ............... 455/11.1, 455/524, 525, 7, 15, 16, 449, 462, 3, 554.2, 455/561, 561.2; 370/316, 327, 328, 338
See application file for complete search history.

(56) References Cited

U.S. PATENT DOCUMENTS

| | | | |
|---|---|---|---|
| 5,233,626 A * | 8/1993 | Ames ........................ | 375/1 |
| 5,319,700 A * | 6/1994 | Mano et al. ............ | 379/93.06 |
| 5,404,570 A | 4/1995 | Charas et al. .................. | 455/22 |
| 5,513,176 A | 4/1996 | Dean et al. ..................... | 370/18 |
| 5,603,080 A | 2/1997 | Kallander et al. ............ | 455/14 |
| 5,661,434 A * | 8/1997 | Brozovich et al. ............ | 330/51 |
| 5,930,293 A | 7/1999 | Light et al. .................. | 375/211 |
| 6,002,918 A * | 12/1999 | Heiman et al. ............ | 455/38.3 |
| 6,005,884 A * | 12/1999 | Cook et al. .................. | 375/202 |

FOREIGN PATENT DOCUMENTS

| | | |
|---|---|---|
| EP | 0884863 | 12/1998 |
| EP | 0884915 | 12/1998 |

* cited by examiner

*Primary Examiner*—Doris H. To
*Assistant Examiner*—Philip J. Sobutka
(74) *Attorney, Agent, or Firm*—Philip R. Wadsworth; Bruce W. Greenhaus; James D. McFarland

(57) ABSTRACT

An apparatus for wireless communication, including a plurality of slave transceivers spatially separated from one another within an enclosed region. Each of the slave transceivers is adapted to receive a reverse radio frequency (RF) signal generated by a mobile transceiver within the region. Furthermore, each slave transceiver processes the RF signal based on at least one adjustable operational parameter and generates a reverse slave signal. Each of the slave transceivers includes an associated slave central processing unit (slave-CPU) adapted to control at least one adjustable operational parameter of the slave transceiver. Control is provided in response to at least one characteristic of the reverse RF signal. The apparatus also includes a master transceiver. The master transceiver is coupled to receive and process the reverse slave signals from the plurality of slave transceivers. Corresponding reverse master signals are then generated by the slave transceiver. The slave transceiver conveys the reverse master signals to at least one base station transceiver subsystems (BTSs) external to the region. The master transceiver is adapted to convey setting signals to the plurality of slave transceivers so as to set the adjustable operational parameters thereof.

17 Claims, 3 Drawing Sheets

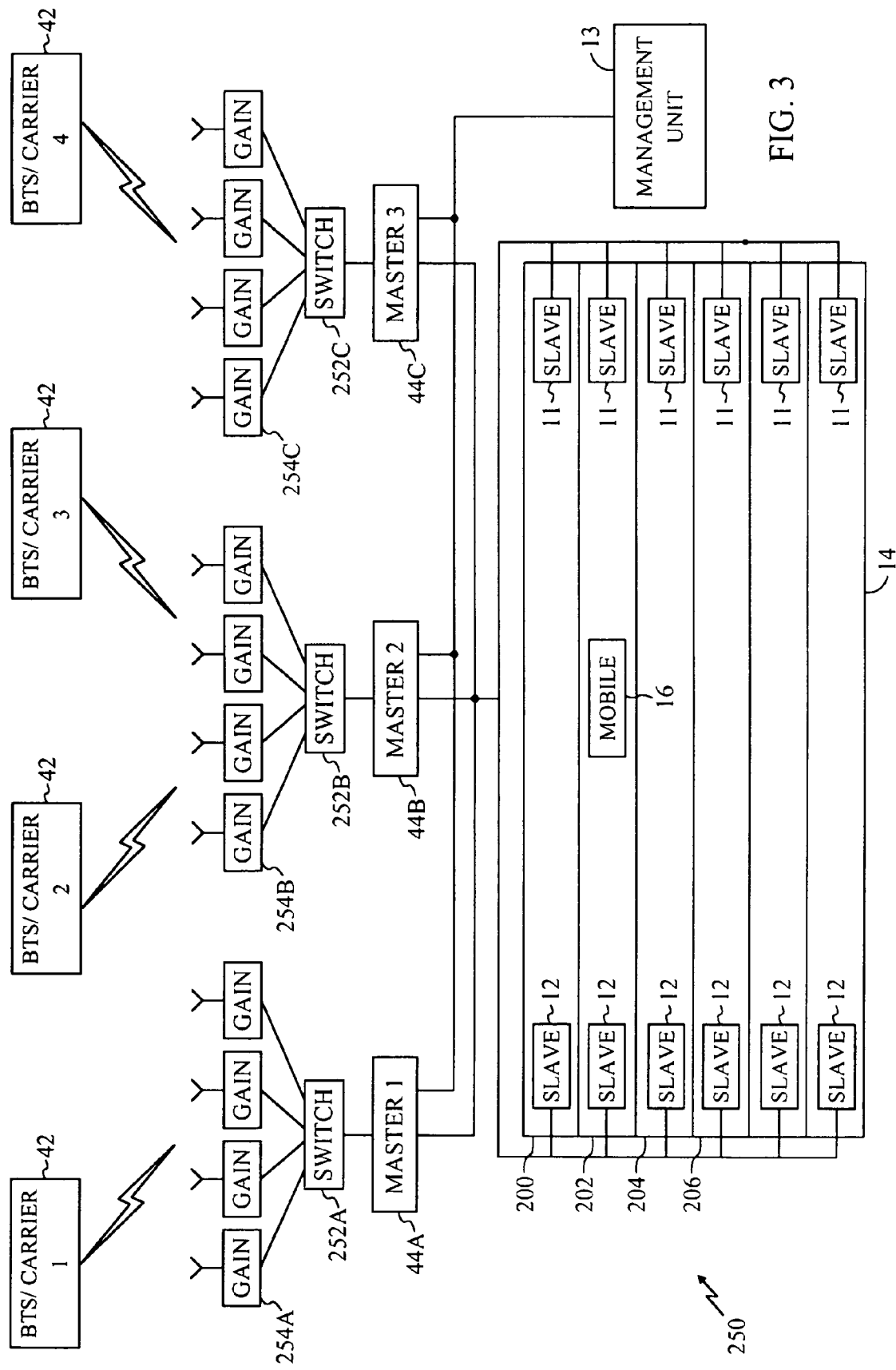

DYNAMIC CAPACITY ALLOCATION OF IN-BUILDING SYSTEM

FIELD OF THE INVENTION

The disclosed method and apparatus relates generally to communication networks, and specifically to cellular communication networks operating in enclosed spaces, which are cut off from cellular signals originating external to such spaces.

BACKGROUND OF THE INVENTION

In cellular communications systems there are typically regions where the coverage is difficult or incomplete, for example, within metal-framed structures, or underground. Methods for improving the coverage in regions such as these are known in the art.

U.S. Pat. No. 5,404,570, to Charas et al, whose disclosure is incorporated herein by reference, describes a repeater system used between a base transceiver station (BTS) capable of receiving signals and a closed environment such as a tunnel that is closed off to transmissions from the BTS. The system down-converts high radio-frequency (RF) signals from the BTS to intermediate frequency (IF) signals. The intermediate frequency signals are then radiated by a cable and an antenna in the closed environment to a receiver therein. The receiver up-converts the IF signal to the original RF frequency. Systems described in the disclosure include a vehicle moving in a tunnel, so that passengers in the vehicle who would otherwise be cut off from the BTS are able to receive signals.

U.S. Pat. No. 5,603,080 to Kallandar et al., whose disclosure is incorporated herein by reference, describes a plurality of repeater systems used between a plurality of BTSs and a closed environment, which is closed off to transmissions from the BTSs. Each system down-converts an RF signal from its associated BTS to an IF signal, which is then transferred by a cable in the closed environment to at least one associated receiver therein. Each receiver up-converts the IF signal to the original RF frequency. Systems described in the disclosure include a vehicle moving between overlapping regions in a tunnel, each region covered by one of the BTSs via its repeater system. Thus, passengers in the vehicle who would otherwise be cut off from at least one of the BTSs are able to receive signals from at least one of the BTSs throughout the tunnel.

U.S. Pat. No. 5,513,176, to Dean et al., whose disclosure is incorporated herein by reference, describes a distributed antenna array within a region where reception is difficult. The performance of the antenna array is enhanced by generating signal diversity within the array. Each antenna in the array has a differential time delay applied to signals that it receives, thus generating received signal diversity. The differentially-delayed signals are preferably down-converted to an intermediate frequency and are then transferred out of the region via a cable.

U.S. Pat. No. 5,930,293, to Light, et al., whose disclosure is incorporated herein by reference, describes a wireless repeater comprising first and second spatially-separated antennas. Both antennas receive a signal from a transmitter, and the signal received by the second antenna has a time delay added to the original signal. The two signals are summed to form one aggregate signal, which is transmitted from a third antenna. A receiver of the aggregate signal is able to reconstruct the signals received by the first and second antennas.

Methods for dynamic allocation of elements of a cellular system are also known in the art. For example, U.S. Pat. No. 5,586,170 to Lea, whose disclosure is incorporated herein by reference, describes a system including a number of base stations that collectively define a service area. The base stations include associated directional antennas coupled to associated transmitters that serve sectors within associated cells. A mobile unit moves in the service area, and is capable of communicating with the base stations. A switch communicates with the base stations, and dynamically allocates channels to the base stations for use in associated sectors. The switch controls at least first and second base stations of different cells to serve communication with the mobile unit in associated sectors on the same channel. At least two base stations report associated signal strengths for communication with the mobile unit, to the switch.

U.S. Pat. No. 5,606,727 to Ueda, whose disclosure is incorporated herein by reference, describes a cellular communications system including a number of base stations which allocate channel time slots and frequencies for acceptable interference between base stations. Each base station divides its area into sectors served by corresponding antennae. Upstream interference levels in all directions are measured, preferably using an omnidirectional antenna. From these levels, candidate channels for assignment to mobile stations are determined. The base station indicates the candidate channel numbers to mobiles in its area. Each mobile measures downstream interference levels in the numbered channels and reports them simultaneously to making or receiving a call. Channels are assigned on the basis of reported levels.

U.S. Pat. No. 5,557,603 to Barlett et al., whose disclosure is incorporated herein by reference, describes communications apparatus for receiving a plurality of calls. The apparatus includes a plurality of receivers tunable to a plurality of frequencies, first and second antennas, switching means for switching the plurality of receivers to selected ones of the first and second antennas and control means coupled to the plurality of receivers for tuning the receivers to receive calls. The apparatus identifies a received call of low quality received through the first of the antennas and switches a spare receiver to receive the call through the second antenna.

German Patent 19,618,947 to Natarajan, whose disclosure is incorporated herein by reference, describes a dynamic channel allocation system for cellular communications. The system enables base station processing of subscriber unit request for channel allocation, or subscriber unit choice of most suitable base station

SUMMARY OF THE INVENTION

In the disclosed method and apparatus, a group of stationary cellular transceivers, herein also termed slave units, are distributed within a region that cannot be conveniently served by at least one base station transceiver subsystem (BTS). The BTSs convey forward signals to at least one master transceiver, herein also termed master units, which in turn convey the signals to associated sets of slave units via at least one forward alternative frequency, such as an intermediate frequency (IF). The particular alternative frequency or frequencies are selected to be compatible with the environment in which the signals are to be transmitted. Each master unit acts as a first repeater, and its slave units act as second repeaters. The slave units communicate via radio frequency (RF) signals with mobile transceivers, such as mobile cellular telephones, in the region. Typically, the region is an interior of a building, or an open region where reception of signals from the BTSs is poor due to distance from the stations or radiation shadowing by a structure between the BTSs and the region.

RF signals received by the sets of slave units from the mobile transceivers, referred to herein as reverse signals, are converted to associated reverse alternative frequency (AF) signals, which are most preferably different for each set of slave units. In the preferred embodiment of the disclosed method and apparatus, the alternative frequency is lower than the frequency of the signal received from the mobile transceivers. However, it will be understood by those skilled in the art that the alternative frequency may be higher than the originally received signal. Each set of reverse AF signals is then transferred from the region to its associated master unit by at least one cable. Each master unit up-converts its reverse AF signals to recover the original RF signals. The RF signals are transmitted by cable and/or over the air separately to the BTSs which demodulate, recover, and analyze the information contained in the reverse RF signals.

Each master unit is coupled to a management unit. Most preferably, an operator of the system uses the management unit to implement initial settings for the master and slave units, and to monitor the overall of the operation of the system.

In preferred embodiments of the disclosed method and apparatus each master unit comprises a master-CPU, and each slave unit comprises a central processing unit (slave-CPU). Each slave-CPU is able to dynamically control operational parameters, such as forward and reverse gain, channel allocation, and bandwidth, of its associated slave unit. Each slave-CPU is also able to deactivate its associated slave unit for a limited period of time. The slave-CPUs of each slave unit most preferably receive initial configuration and operation settings from the management unit via their associated master-CPU unit. During system operation the slave-CPUs of each slave unit operate dynamically in a substantially autonomous manner, according to the configuration and operation settings received from the master-CPUs. At substantially any time during system operation each master unit is able to intervene in the operation of its slave units, by the master-CPU changing settings of the associated slave-CPUs in an on-going manner. Furthermore, each master unit, via its associated master-CPU, is able to monitor and control its own forward and reverse RF and AF gains, channel allocation and input levels of each BTS with which it communicates.

By dynamically controlling the operation of each of the slave units substantially independently, and by providing the ability for slave unit settings to be altered dynamically by their associated master units, the overall signal-to-noise ratio of the system can be significantly improved, and system degradation in the presence of strong interfering signals can be reduced, by comparison with master/slave systems known in the art, in which this type of dynamic control is not provided.

In some preferred embodiments of the disclosed method and apparatus, the operator of the system is able to change the system settings during operation, overriding if necessary the initial settings. For example, the operator is able to change settings of specific slave units to increase or decrease the coverage provided by those units.

In some preferred embodiments of the disclosed method and apparatus comprising more than one BTS, the system is able to dynamically control how many BTSs communicate with each master unit. The system is further able to control associated channel parameters of each BTS. The control is most preferably performed responsive to signals received from the CPUs of the slave units, enabling one of the master units and/or the operator of the management unit to effectively control the number of BTSs, and parameters of each of the BTSs, allocated to the enclosed region wherein the slave units are located.

Because the individual slave units are independently configurable, preferred embodiments of the disclosed method and apparatus enable significantly greater flexibility of operation within enclosed regions in comparison with master/slave systems known in the art. For example, within an enclosed region coverage may be increased and/or decreased for at least one specific part of the region. The coverage changes may be implemented substantially independently by the slave units, or in combination with at least one of the master unit, or substantially independently by at least one of the master units.

There is therefore provided, according to a preferred embodiment of the disclosed method and apparatus, apparatus for wireless communication, including:

a plurality of slave transceivers which are spatially separated from one another within an enclosed region, each of which slave transceivers is adapted to receive a reverse radio frequency (RF) signal generated by a mobile transceiver within the region and to process the RF signal, based on at least one adjustable operational parameter, so as to generate a reverse slave signal, each of the slave transceivers comprising a associated slave central processing unit (slave-CPU) which is adapted to control at least one of the adjustable operational parameters of its associated slave transceiver responsive to at least one characteristic of the reverse RF signal; and a master transceiver, which is coupled to receive and process the reverse slave signals from the plurality of slave transceivers so as to generate corresponding reverse master signals, and to convey the reverse master signals to at least one base station transceiver subsystem (BTS) external to the region, and which is adapted to convey setting signals to the plurality of slave transceivers so as to set the adjustable operational parameters thereof.

Preferably, the plurality of slave transceivers includes at least one diversity transceiver and at least one main transceiver, so that the RF signal received by the at least one diversity transceiver is substantially different from the RF signal received by the at least one main transceiver.

Preferably, the apparatus includes a management unit which is adapted to convey instructions to the plurality of slave-CPUs to set at least one of the adjustable operational parameters of each of the slave transceivers to initial values.

Preferably, the master transceiver is coupled to receive and process forward RF signals from at least one of the BTSs so as to generate corresponding forward master signals and to convey the forward master signals to the plurality of slave transceivers, wherein each slave transceiver is adapted to receive the forward master signals and to generate corresponding forward slave RF signals, and wherein each slave-CPU is adapted to monitor its associated forward slave signals and, responsive thereto and to its associated reverse slave signals, to adjust at least one of the operational parameters of its associated slave transceiver so as to vary at least one of the associated operational parameters from their initial values.

Further preferably, the master transceiver includes a master-CPU which is adapted to monitor at least one of the slave-CPUs and, responsive to those slave-CPUs and to initial instructions received from the management unit, to vary at least one of a group including a number of BTSs communicating with the master transceiver and at least one channel parameter of each BTS.

There is further provided, according to a preferred embodiment of the disclosed method and apparatus, a method for wireless communication, including:

positioning a plurality of slave transceivers, each including a slave central processing unit (slave-CPU) which is adapted to control at least one adjustable operational parameter of its associated slave transceiver, within an enclosed region;

receiving a reverse radio frequency (RF) signal generated by a mobile transceiver within the region within at least one of the plurality of slave transceivers;

controlling at least one of the associated adjustable operational parameters of at least one of the plurality of slave transceivers in response to at least one characteristic of the reverse RF signal;

generating reverse slave signals in at least one slave transceiver in response to the RF signal and to at least one of the adjustable operational parameters of the slave transceivers;

receiving and processing the reverse slave signals in a master transceiver;

conveying the processed signals to a base station transceiver subsystem (BTS) external to the region; and conveying setting signals from the master transceiver to the plurality of slave transceivers so as to set the adjustable operational parameters thereof.

adjusting at least one of the operational parameters of at least one of the plurality of slave transceivers in response to the control signals.

Preferably, the plurality of slave transceivers includes at least one diversity transceiver and at least one main transceiver, so that the RF signal received by the at least one diversity transceiver is substantially different from the RF signal received by the at least one main transceiver.

Preferably, the method includes conveying instructions to the plurality of slave-CPUs from a management unit, so as to set at least one of the adjustable operational parameters of each of the slave transceivers to initial values.

Further preferably, the method includes:

receiving and processing in the master transceiver forward RF signals from the BTS;

generating forward master signals corresponding to the processed forward RF signals;

conveying the forward master signals to the plurality of slave transceivers, receiving and processing in the plurality of slave transceivers the forward master signals and generating corresponding forward slave RF signals therein;

monitoring the corresponding forward slave RF signals in each of the slave transceivers; and varying at least one of the operational parameters of each of the slave transceivers from their initial values, responsive to the associated forward slave signals and reverse slave signals.

Further preferably, the master transceiver includes a master-CPU which is adapted to monitor at least some of the slave-CPUs and, responsive thereto and to initial instructions received from the management unit, to vary at least one of a group including a number of BTSs communicating with the master transceiver and at least one channel parameter of each BTS.

There is further provided, according to a preferred embodiment of the disclosed method and apparatus, apparatus for wireless communication, including:

a first plurality of slave transceivers which are spatially separated from one another within an enclosed region, each of which slave transceivers is adapted to receive a reverse radio frequency (RF) signal generated by a mobile transceiver within the region and to process the RF signal, based on at least one adjustable operational parameter, so as to generate a reverse slave signal, each of the slave transceivers comprising a associated slave central processing unit (slave-CPU) which is adapted to control at least one of the adjustable operational parameters of its associated slave transceiver in response to at least one characteristic of the reverse RF signal; and a second plurality of master transceivers, which are coupled to receive and process the reverse slave signals from the first plurality of slave transceivers so as to generate corresponding reverse master signals, and to convey the reverse master signals to a third plurality of base station transceiver subsystems (BTSs) external to the region, and which are adapted to convey setting signals to the first plurality of slave transceivers so as to set the adjustable operational parameters thereof.

Preferably, each of the master transceivers includes a switch and a third plurality of gain elements and a master-CPU, wherein the master-CPU of each master transceiver is adapted to operate the switch and the third plurality of gain elements of the associated master transceiver so that the associated master transceiver communicates via the third plurality of gain elements with at least one of the third plurality of BTSs.

Further preferably, each of the master transceivers is adapted to adjust a bandwidth of at least some of the slave transceivers responsive to the number of BTSs being communicated with via the third plurality of gain elements.

The disclosed method and apparatus will be more fully understood from the following detailed description of the preferred embodiments thereof, taken together with the drawings, in which:

BRIEF DESCRIPTION OF THE DRAWINGS

FIG. 3 is a schematic block diagram of an alternative area coverage system, according to a preferred embodiment of the disclosed method and apparatus.

DETAILED DESCRIPTION OF PREFERRED EMBODIMENTS

Figure 1:
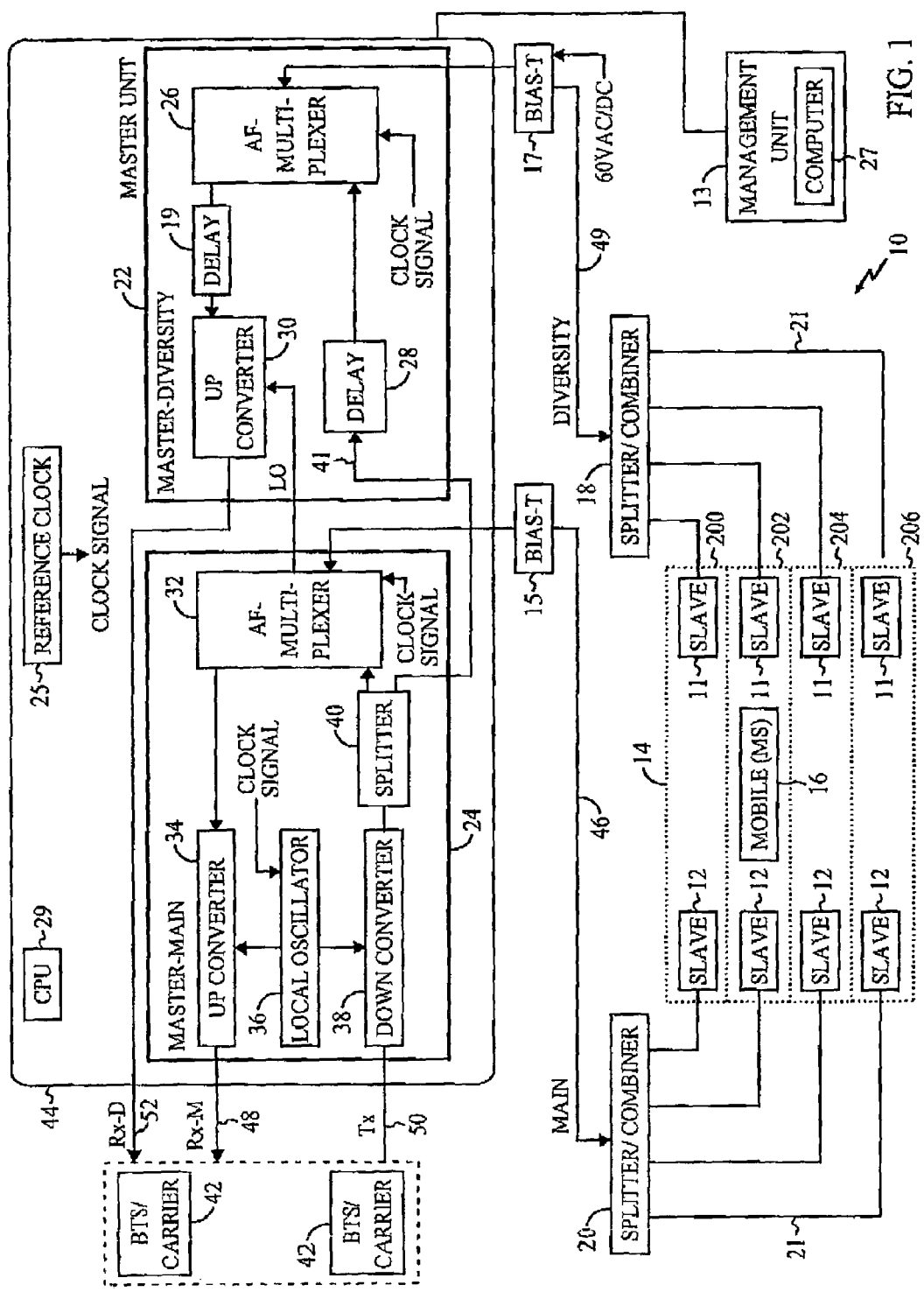
FIG. 1 is a schematic block diagram showing an area coverage system, according to a preferred embodiment of the disclosed method and apparatus.

FIG. 1 is a schematic block diagram showing an area coverage system 10, according to one embodiment of the disclosed method and apparatus. A building 14 is substantially closed off to electromagnetic radiation from at least one substantially similar base station transceiver subsystem (BTS) 42 external to the building. A mobile transceiver 16 within the building, such as an industry-standard mobile telephone, emits a radio frequency (RF) signal receivable by BTSs 42. In accordance with one embodiment, the RF signal emitted by mobile transceiver 16, herein also termed the reverse-RF transmitted signal, is a code division multiple access (CDMA) signal operating at an industry-standard chip rate. It will be understood by those skilled in the art that the principles of the disclosed method and apparatus are also applicable to other coding and transmission schemes.

A first sub-group of slave transceivers 12, herein also termed main slave transceivers, and a second sub-group of slave transceivers 11, herein also termed diversity slave transceivers, are positioned within building 14. Main slave transceivers 12 are most preferably connected in a star configuration, by at least one active splitter/combiner 20. Alternatively, slave transceivers 12 are connected in a daisy chain or a hybrid star-daisy chain configuration. Similarly, diversity slave transceivers 11 are most preferably connected in a star configuration, by at least one active splitter/combiner 18. Alternatively, slave transceivers 11 are connected in a daisy chain or a hybrid star-daisy chain configuration. Slave transceivers 11 and 12 are preferably connected to their associated splitter/combiners 20 and 18 by cables 21.

Slave transceivers 11 are separated spatially from slave transceivers 12, but otherwise the slave transceivers are all substantially similar in construction and operation. A description of the operation and construction of suitable slave transceivers is given below with reference to FIG. 2. The spatial separation is sufficient so that when mobile transceiver 16 makes a transmission the reverse-RF signal received by the sub-group of slave transceivers 11 is distinguishable from the reverse-RF signal received by the sub-group of slave transceivers 12. For example, the received signals may differ in amplitude, or in phase, or in time of arrival, or in a combination of these or other signal parameters. Thus, main slave transceivers 12 receive the RF signal from mobile transceiver 16 as a main-reverse RF signal, and diversity slave transceivers 11 receive the RF signal from mobile transceiver 16 as a diversity-reverse RF signal.

Slave transceivers 11 and 12 process the RF signals received from the mobile transceiver 16. Processing consists of mixing the received RF signal with a local oscillator signal. The RF signals preferably down-converted to an alternative frequency (AF) signal, as is known in the art. In an alternative embodiment of the disclosed method and apparatus, the signals are up-converted to a higher frequency. The processing performed by slave transceivers 11 and 12 also includes amplifying or attenuating and filtering the frequency converted signal. Accordingly, the RF signals are processed based upon operational parameters such gain, bandwidth, frequency, etc. Each of these operational parameters may be adjustable. These parameters are preferably controlled by a central processing unit (CPU) 150 within the slave transceiver (see FIG. 2) as will be discussed in more detail below.

The AF signals from main slave transceivers 12 are transmitted as main-AF signals from building 14, via splitter/combiner 20, a cable 46, and a bias-T filter 15 in the course of the cable, to a main-master sub-unit 24 comprised in a master transceiver 44. Splitter/combiner 20 is shown as being outside building 14. However, in an alternative embodiment of the disclosed method and apparatus, the splitter/combiner 20 may be inside building 14.

Main-master sub-unit 24 comprises an AF-multiplexer 32, which transfers the main-AF signals to a converter 34 (preferably an up-converter) in the main-master sub-unit. In converter 34 the main-AF signals are mixed with a local oscillator (LO) signal, generated by a local oscillator 36 most preferably comprised in main-master sub-unit 24 and fed with a reference clock signal provided by a clock 25, in order to recover the main-reverse RF signal received by main slave transceivers 12. The recovered main-reverse RF signal is then transmitted to at least one of the BTSs 42, preferably via a cable connection 48. Alternatively or additionally, the recovered main-reverse RF signal is transmitted to at least one of BTSs 42 via a wireless connection and/or other means known in the art such as fiber optic cable. Methods for down-conversion and up-conversion of a transmitted RF signal as described hereinabove are known in the art, and a detailed description of one such method is given in a U.S. patent application Ser. No. 09/430,616, entitled "In-Building Radio Frequency Coverage," filed Oct. 29, 1999, which is assigned to the assignee of the present application and whose disclosure is incorporated herein by reference. It will be appreciated that slave transceivers 11 and 12 and master transceiver 44 act associatedly as first repeaters coupled to a second repeater, for the purpose of transferring signals to at least one BTS from the building.

The AF signals from diversity slave transceivers 11 are transmitted as diversity-AF signals from building 14, via splitter/combiner 18, a cable 49, and a bias-15 T filter 17 in the course of the cable, to a diversity-master sub-unit 22 comprised in master transceiver 44. Diversity-master sub-unit 22 comprises an AF-multiplexer 26, which transfers the diversity-AF signals, most preferably via a central delay 19, to an frequency converter 30 (preferably an up-converter) comprised in the diversity-master sub-unit. Alternatively or additionally, the signals are delayed in slave units 11, as described with reference to FIG. 2 below. Most preferably, for CDMA signals, the delay added is of the order of at least twice the chip period of the modulated RF signal transmitted by mobile transceiver 16. In frequency converter 30 the diversity-AF signals are most preferably mixed with the local oscillator signal generated by LO 36, in order to recover the diversity-reverse RF signal received by diversity slave transceivers 11. The recovered diversity-reverse RF signal is then transmitted to at least one BTS 42, preferably via a cable connection 52. Alternatively, the recovered diversity-reverse RF signal is transmitted to at least one BTS 42 via a wireless connection. It will be appreciated that the diversity-reverse RF signal is transmitted separately from the main-reverse RF signal to at least one of the BTSs, so that no degradation of signal/noise occurs by combining the two reverse RF signals, and so that reverse carrying capacity of the network is improved.

Main-master sub-unit 24 also comprises a down-converter 38, which receives a forward-RF signal from BTSs 42. Preferably the forward-RF signal is transferred from at least one BTS 42 to down-converter 38 by a cable connection 50. Alternatively, the forward-RF signal is transferred from at least one of the BTSs to the down-converter 38 by a wireless connection. Down-converter 38 most preferably utilizes the LO signal from LO 36 to produce a forward-AF signal. The forward-AF signal is transferred to a splitter 40, which divides the forward-AF signal into a first and a second substantially similar forward-AF signal. The first forward-AF signal is transferred via multiplexer 32 and splitter/combiner 20 to transceivers 12, wherein the BTS forward-RF signal is recovered by up-conversion.

The second forward-AF signal is transferred via a routing 41 to duplexer 26. Routing 41 is preferably a cable or other type of conveyer of signals, such as one or more printed circuit board lines. In the course of routing 41 there is a delay unit 28, most preferably formed from a surface acoustic wave filter acting as a delay generator. Alternatively, delay unit 28 may comprise any standard delay unit which is able to add a time delay to the forward-AF signals transmitted from splitter 28. Most preferably, the delay added by delay unit 28 is of the order of at least twice the chip period of the modulated RF signal transmitted by mobile transceiver 16. The delayed forward-AF signal is transferred via multiplexer 26 and splitter/combiner 18 to diversity slave transceivers 11, wherein a delayed forward-RF signal is recovered by up-conversion. Preferably, the reference clock signal is also transferred via multiplexers 26 and 32 to their associated slave units for use as a reference for generating local oscillator signals in the slave units, by methods known in the art. Alternatively, suitable local oscillator signals are generated in the slave units by other methods known in the art.

Master unit 44 most preferably comprises a CPU 29 which is able to control settings of gains of amplifiers in frequency converters 34 and 30 (preferably the up-converters), in frequency converter 38 (preferably the down-converter), or in circuitry associated with these converters, and delays 19 and 28. As described below, CPU 29 also communicates instructions to slave units 11, 12 which are coupled to master unit 44.

Mobile transceiver 16 receives both the recovered forward-RF signal transmitted from transceivers 12 and the recovered delayed forward-RF signal transmitted from transceivers 11. The forward-RF signal and the delayed forward-RF signal are then utilized to derive an optimal forward-RF signal transmitted from at least one BTS 42, using methods known in the art. For example, if the RF signal is a CDMA pilot RF signal, generated by one of the BTSs for tracking mobile transceivers, mobile transceiver 16 is able to demodulate and recover the pilot signals by identifying strong multipath arrivals with a searcher comprised in the transceiver. Alternatively, optimal signals can be recovered by non-CDMA systems which are able to tolerate delays of the size described hereinabove, and/or which can implement appropriate delays. For example, a GSM system requires a delay of the order of 8 $\mu$s.

System 10 comprises a management unit 13, coupled to master transceiver 44, which enables an operator of the system to implement initial settings of the system, and to monitor parameters of the system. Management unit 13 preferably comprises an industry-standard personal computer 27, which enables the unit to communicate setting signals to CPU 29 of master unit 44. Furthermore, management unit 13 communicates setting signals to slave units 11 and 12 via the master unit, as described below. Alternatively, management unit 13 is able to communicate setting signals to master unit 44 and slave units 11 and 12 by other methods known in the art. As explained in more detail below, the setting signals are able to alter operating parameters of each of the slave units. The operating parameters comprise the gain of at least one the amplifiers comprised in the slave unit, so that the forward and/or reverse gains of each slave unit are controlled. Preferably, the operating parameters also comprise a bandwidth, and/or a channel allocation or an equivalent parameter, of each of the slave units. Further preferably, the control signals are able to switch each slave unit on or off.

Figure 2:
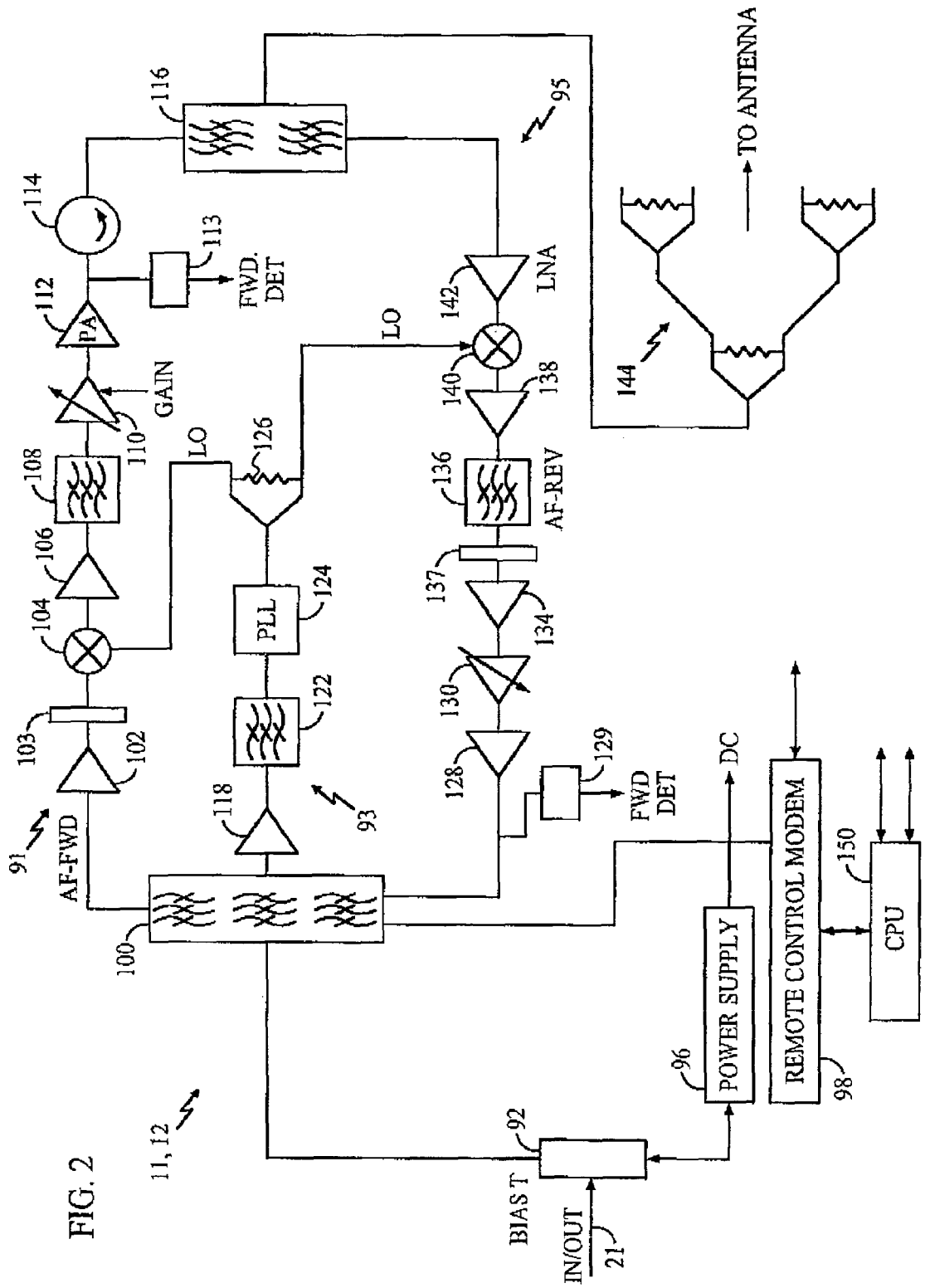
FIG. 2 is a schematic block diagram of a slave transceiver comprised in the system of FIG. 1, according to a preferred embodiment of the disclosed method and apparatus.

FIG. 2 is a schematic block diagram of one of the slave transceivers 11, 12 (either a diversity slave transceiver 11 or a main slave transceiver 12) according to one embodiment of the disclosed method and apparatus. Each slave transceiver 11, 12 comprises a bias-T filter 92 which receives the forward-AF (AF-FWD) signal, the reference clock signal, the control signals, and a DC or AC level from master transceiver 44 via cables 21. If the level is a DC level it is most preferably set at approximately 48 V or approximately 24 V to comply with telephony standards. If the level is an AC level it is most preferably set at approximately 60 V to comply with cable television (CATV) standards. Bias-T filter 92 is also able to transfer signals between other slave units connected to cables 21 and master transceiver 44. Most preferably, filter 92 is implemented so that coupling or decoupling one of slave transceivers 11, 12 from cables 21 does not significantly affect operation of the other slave units.

Filter 92 acts as a port, splitting off the DC or AC level to power each slave transceiver 11, 12 either directly or via an optional power supply 96. Filter 92 transfers the RF signals, the reference clock signals, and the setting signals received from master transceiver 44 to a multiplexer 100. Multiplexer 100 filters and separates the RF signals into the AF-FWD signal and the reference clock signal, and splits off the settings signals which it transfers to a remote control modem 98. The AF-FWD signal follows a forward path 91, and the clock signal follows a path 93.

Each slave transceiver 11, 12, comprises a central processing unit (CPU) 150. CPU 150 acts as a local controller for the slave transceiver associated with that CPU 150. The CPU can alter dynamically, either directly or via modem 98 or by other means known in the art, settings of each variable element in the associated slave transceiver 11, 12. In addition, CPU 150 is able to switch its associated slave transceiver 11, 12 on and off.

Path 93 comprises a pre-amplifier 118 and a band-pass filter 122. The filtered clock signal is input as a reference to a phase-locked loop oscillator/amplifier 124, which generates an LO signal having substantially the same frequency as the frequency of local oscillator 36. The amplified LO signal is input to a splitter 126. From the splitter the signal is input to a mixer 104 and a mixer 140. The power level of the LO signal input to the splitter is preferably set as required to drive mixers 104 and 140. At least some of the gains of amplifier 118 and oscillator/amplifier 124 are controlled by modem 98 and/or CPU 150, so that a gain of path 93 can be set by the modem and/or the CPU.

Path 91 comprises a preamplifier 102, which receives frequencies centered on AF-FWD from multiplexer 100. The AF-FWD signal is then amplified in an amplifier 102 before it is input to an optional delay 103. Delay 103 may be a variable or a fixed delay. When implemented as a fixed delay, delay 103 preferably comprises a surface acoustic wave (SAW) delay device. The SAW delay device preferably delays signals in path 91 by 1–2 $\mu$s. Most preferably, the time delay is set to be at least one chip rate of CDMA signals received by the master transceiver 44. When implemented as a variable delay, the time delay provided by delay 103 is preferably set by remote control modem 98 and/or CPU 150. Alternatively or additionally, the AF-FWD signals are delayed by delay 28 of master unit 44.

The signal from delay 103 or preamplifier 102 is coupled to the input of mixer 104. Mixer 104 up-converts the AF-FWD signal received, using the LO signal, to regenerate the master RF signal received by master transceiver 44. The regenerated RF signal is amplified in an RF amplifier 106 and filtered in a band-pass filter 108. Preferably, the bandwidth of filter 108 is set and/or adjusted by modem 98 and/or CPU 150. The amplifier and filter together provide an RF signal at a level suitable for coupling to the input of a variable-gain amplifier 110 and an RF power amplifier 112. The gain of amplifier 110 is set by modem 98 and/or CPU 150. Power amplifier 112 generates an RF power output signal based on the power output of master transceiver 44 and the slave unit gain settings. The latter in turn are adjusted to compensate for cable loss between master and slave units, and are set to a power level dictated by the master-CPU.

The power signal from amplifier 112 is transferred via an isolator 114 to increase the voltage standing wave ratio. Most preferably, the power output of master transceiver 44 is defined within a preset window, and the slave unit gain settings substantially determine the RF power output. A level of the forward power output by amplifier 112 is measured by a power detector 113, and the measured level is communicated to CPU 150 so that the CPU has relevant information for determining variable settings of its transceiver. The power signal is input to an RF duplexer 116 which acts as a port and routes the power signal to at least one slave antenna 144 that radiate the RF power signal. Most preferably, modem 98 and/or CPU 150 sets parameters of elements in forward path 91 which control the gain, bandwidth, and delay of the signal in the path responsive to readings from detector 113 and controlling input signals to the modem and/or the CPU.

Antennas 144 also receive a slave RF signal from mobile transceiver 16. The slave signal is routed via RF duplexer 116 along a reverse path 95 to a low nose pre-amplifier 142. The pre-amplifier is most preferably constructed from very-low-noise components by methods known in the art. A mixer 140 uses the LO signal received from splitter 126 and the output signal of pre-amplifier 142 to down-convert the slave RF signal to an intermediate frequency signal AF-REV. The AF-REV signal is amplified by an amplifier 138 feeding a band-pass filter 136. The filter 136 and amplifier 138 together operate to generate an AF-REV signal substantially free from unwanted sidebands, such as those produced in mixer 140.

The AF-REV signal output of filter 136 is optionally output to a fixed delay 137. When implemented, delay 137 preferably comprises a SAW device that delays signals in path 95 by a fixed time of the order of 2 μs. Alternatively or additionally, the reverse signals are delayed in delay 19 of master unit 44. The signal from delay 137 or filter 136 is routed through an amplifier 134, a variable-gain amplifier 130 having a gain set by modem 98, and a power amplifier 128 to multiplexer 100. A level of the reverse power output by amplifier 128 is measured by a power detector 129. Multiplexer 100 routes the output of amplifier 128 via filter 92 to the master transceiver 44.

Remote control modem 98 is able to receive and decode control and monitoring signals originating from master transceiver 44, either directly or via CPU 150. Most preferably, the control and monitoring signals are utilized to set and/or read parameters of elements within slave transceiver 11, 12, such as the gains of amplifiers 110 and 130 and the delay time of delay 103 when the delay is variable, and/or detected levels of signals within the slave unit. Preferably, parameters affecting the operation of each slave transceiver 11, 12, such as gains of amplifiers 110 and 130, are preset via management unit 13 when each slave transceiver 11, 12 is set up. Once set up, each slave transceiver 11, 12 is able to operate substantially independently. Most preferably, the overall signal gain, from port to port, for path 91 and for path 95 is initially set to be of the order of 10–60 dB for each path.

Returning to FIG. 1, in operation, signals received by slave transceivers 11, 12 from mobile transceivers such as mobile transceiver 16 within building 14 are monitored by detector 129 and the results are conveyed to CPU 150 of the associated slave transceiver. Typically levels of demand on each of slave transceivers 11, 12 vary greatly, depending for example on traffic within the building and on time of day. Preferred embodiments of the disclosed method and apparatus allow specific slave transceivers to have their reverse gains reduced by their associated CPU 150 if they are receiving high signal levels.

During operation, each slave transceiver is able to dynamically alter the gains in path 91 and path 95, and is also able to switch off either or both paths for a predetermined limited time, preferably of the order of 1 s. Particularly in the case of reverse path 95, the ability to reduce the gain, and/or to switch off the path for a limited time, enables preferred embodiments of the disclosed method and apparatus to protect overall operation of the system. For example, a specific slave transceiver may receive a reverse RF signal from mobile transceiver 16 which, even after gain reduction, is determined by detector 129 to be above a predetermined threshold, and which would normally block some other slave transceivers or even all system 10. In this case the CPU of the slave transceiver can intervene by temporarily reducing its gain further, and if this is insufficient, even temporarily switching off its path 95 and/or its forward path 91, so that only temporary local degradation of the specific slave transceiver occurs, and the rest of system 10 continues to operate in an unblocked manner.

CPU 150 can also monitor forward signals sent from master transceiver 44 to its slave transceiver using detector 113. As for the cases described above, CPU 150 is able to alter forward operational parameters of its slave transceiver. For example, CPU 150 may reduce the gain or even temporarily shut down forward transmissions to and/or from the transceiver, or temporarily close forward path 91 and/or reverse path 95 (FIG. 2), and then at some later time reset the transceiver conditions. A similar process is preferably implemented by master-CPU 29 in the master transceiver to protect against exceptional power levels at the forward or reverse link therein, for example when the forward or reverse power levels cross a predetermined threshold. The actions of CPU 150 and/or CPU 29 in the examples described hereinabove lead to improvements in the overall signal-to-noise ratio and minimize system degradation in the presence of strong interfering signals. It will be understood that such improvements are not possible in systems where the slave transceivers are not dynamically monitored and controlled.

In some preferred embodiments of the disclosed method and apparatus, slave transceivers 11, 12 in a specific region of building 14 may have their operating parameters adjusted, by their associated CPUs 150, according to instructions from management unit 13 and/or master-CPU 29. For example, if an operator of system 10 knows that a conference is being held or is to be held on a floor 202 of building 14, the operator may use unit 13 to transmit parameters to slave transceivers 11, 12, via master-CPU 29, on floor 202 to increase their gain, thus increasing the coverage of system 10 for floor 202. Correspondingly, gains on adjacent floors 200 and 204 may be decreased, and at least some of slave transceivers 11, 12 on these floors, and on a more distant floor 206, may be switched off by their associated CPUs 150 via instructions from their master-CPU 29, to decrease the coverage on floors other than floor 202. When the conference concludes, settings of the gains of slave transceivers 11, 12 most preferably return to the values set at installation of the transceivers, either by instructions transmitted from unit 13 and/or master-CPU 29, or by a default system such as each CPU returning its associated transceiver to the installation settings.

Alternatively, a substantially similar effect to that described hereinabove for dynamic alteration of coverage for at least one region of building 14 may also be provided by preprogrammed instructions to each CPU 150 of slave transceivers 11, 12, without specific instructions from unit 13. Thus, if the CPU of a specific slave transceiver determines that it and a predetermined number of neighboring slave transceivers are receiving increased signal activity, thus implying that an activity such as the conference described above is occurring, the slave transceivers may alter their own gains accordingly, most preferably under the overall control of master-CPU 29 and/or unit 13. Furthermore, in regions where the activity warrants, the CPUs of at least some slave transceivers in those regions may decrease the associated gains or temporarily switch off at least one path within the associated transceivers. It will be appreciated that operation of system 10 as described above enables the capacity of the system to be allocated dynamically and locally.

When more than one BTS 42 communicates with master unit 44, the number and/or the channel parameters of each of the BTSs are controlled by system 10. Most preferably, the control is implemented by management unit 13 supplying instructions to CPU 29 of unit 44 when system 10 is initialized. During operation of the system, CPU 29 uses the instructions from unit 13 to analyze communications from each CPU 150 comprised in the slave units, and responsive to the communications decides on a level of service needed from BTSs 42. CPU 29 then preferably implements the decision by communicating with BTSs 42. Alternatively, CPU 29 and/or unit 13 implement the decision autonomously. For example, if CPUs 150 indicate that there is much traffic in building 14, CPU 29 is able to increase the number of BTSs allocated to the building. Conversely, if traffic within the building decreases, CPU 29 reduces the number of BTSs communicating with the building.

FIG. 3 is a schematic block diagram of an alternative area coverage system 250, according to a preferred embodiment of the disclosed method and apparatus. Apart from the differences described below, the operation of system 250 is generally similar to that of system 10 (FIGS. 1 and 2), so that elements indicated by the same reference numerals in both systems 250 and 10 are generally identical in construction and in operation. System 250 comprises a plurality of master units 44A, 44B, and 44C, which are substantially similar in operation and construction to master unit 44, except that they preferably communicate with slave units 11, 12 at different AFs. Each master unit 44A, 44B, and 44C preferably communicates with a separate set of slave units comprised in slave units 11, 12, by methods known in the art. Preferably, the sets are generally equal in numbers. Each master unit 44A, 44B, and 44C is controlled, substantially as described above for master unit 44, by management unit 13.

Each master unit 44A, 44B, and 44C is able to communicate with at least one of a plurality of BTSs 42, which act as signal carriers in communication with the master units. Master unit 44A communicates with the BTSs via switch 252A and a plurality of substantially similar gain control elements 254A, the plurality equaling the plurality of BTSs. Master unit 44A controls the operation of switch 252A and gain elements 254A. Switch 252A is implemented so that master unit 44A is able to communicate with no BTS 42, any one BTS 42, or with any combination of BTSs 42, via the switch and appropriate gain units 254A and preferably equalizes the levels generated therein.

Master units 44B and 44C communicate with the BTSs via associated switches 252B and 252C and associated pluralities of gain elements 254B and 254C, substantially as described above for master unit 44A communicating with the BTSs. Switches 252B and 252C are substantially similar to switch 252A in function. Each gain element 254B and 254C is substantially similar to gain element 254A in function.

The presence in system 250 of the plurality of master units 44A, 44B, and 44C, with their associated switches and gain elements, gives the system great flexibility in dynamically adapting to general and/or local changes in use within building 14. For example, during periods of low use in the building, such as during a weekend or at night, each master unit may set its associated switch and gain element to communicate with only one BTS 42. As use increases, one of the master units may increase the number of BTSs which is coupled to the unit, by changing the settings of its associated switch and gain elements. The change in settings may be implemented by more than one of the master units, until all master units are communicating with all BTSs.

If in system 250 there is a change in use in a specific region of building 14, for example an increase in use on floor 204, the master unit communicating with slave units 11, 12 on that floor most preferably increases the number of BTSs it communicates with. Optionally, other master units may reduce the number of BTSs with which they communicate. Most preferably, the bandwidth of associated slave units 11, 12 is adjusted, according to instructions from the master-CPU and/or unit 13, according to the number of BTSs and/or carriers being communicated with.

It will be appreciated that the scope of the disclosed method and apparatus includes regions other than buildings closed off to electromagnetic radiation. Such regions comprise areas which are out of range of a base transceiver station due to distance from the station, or areas which are in a radiation shadow due to, for example, topography of the area, or because of a structure such as a building intervening between the area and the station. Furthermore, radio-frequencies other than those described hereinabove may be used to transfer signals between master units and slave units. Such intermediate radio-frequencies comprise optical frequencies, wherein signals are transferred via optical carrying media such as fiber optic cable, and other frequencies and media known in the art which are able to transfer information between the master and slave units in the form of electromagnetic radiation. It will also be appreciated that not all of the capacity of any specific BTS is necessarily utilized in communicating with regions described hereinabove.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus for wireless cellular telephone communication, comprising:

a) a plurality of slave transceivers spatially separated from one another within an enclosed region, each of the slave transceivers comprising an associated slave central processing unit (slave-CPU), each slave-CPU being adapted to control at least one adjustable operational parameter of its associated slave transceiver in response to at least one characteristic of a received reverse radio frequency (RF) telephone signal, and each slave transceiver being adapted to:

i) receive the reverse RF telephone signal;

ii) process the received RF telephone signal based on at least one of the adjustable operational parameters; and
iii) generate a reverse slave telephone signal;
b) a master transceiver coupled to the plurality of slave transceivers, the master transceiver being adapted to:
i) convey setting signals to the plurality of slave transceivers so as to set the adjustable operational parameters thereof;
ii) receive and process the reverse slave telephone signals from the plurality of slave transceivers, so as to generate corresponding reverse master telephone signals; and
iii) convey the reverse master telephone signals to at least one base station transceiver subsystem (BTS) external to the region; and
wherein at least one of the slave-CPUs is adapted to vary a size of a coverage area provided by an associated slave transceiver, and the at least one slave-CPU varies the size of the coverage area provided by the associated slave transceiver responsive to instructions received from one of the following:
the at least one slave-CPU associated with the slave transceiver independent of the master transceiver;
the at least one slave-CPU associated with the slave transceiver in combination with the master transceiver; and
the master transceiver independent of the at least one slave-CPU associated with the slave transceiver.

2. The apparatus of claim 1, wherein the plurality of slave transceivers comprises at least one diversity transceiver and at least one main transceiver, wherein the RF telephone signals received by the diversity transceivers are substantially different from the RF telephone signal received by the main transceivers.

3. The apparatus of claim 1, further comprising a management unit adapted to convey instructions to the plurality of slave-CPUs to set at least one of the adjustable operational parameters of at least one of the slave transceivers to initial values.

4. The apparatus of claim 3, wherein the master transceiver is coupled to the BTSs and adapted to:
a) receive and process forward RF telephone signals from the BTSs;
b) generate corresponding forward master telephone signals; and
c) convey the forward master telephone signals to the plurality of slave transceivers; and
wherein each slave transceiver is adapted to:
a) receive the forward master telephone signals; and
b) generate corresponding forward slave RF telephone signals; and
wherein each slave-CPU is adapted to:
a) monitor The generated forward slave telephone signals; and
b) adjust at least one of the operational parameters from an initial value in response to the generated forward slave telephone signals.

5. The apparatus of claim 4, wherein the slave-CPU is further adapted to adjust at least one of the operational parameters from an initial value in response to the generated reverse slave telephone signals.

6. The apparatus of claim 4, wherein the master transceiver comprises a master-CPU which is adapted to monitor at least some of the slave-CPUs and, in response to the slave-CPUs and to initial instructions received from the management unit, to vary at least one of a group comprising a number of BTSs communicating with the master transceiver and at least one channel parameter of each BTS.

7. A method for wireless cellular telephone communication, comprising:
a) positioning a plurality of slave transceivers within an enclosed region, at least one of the slave transceivers comprising a slave central processing unit (slave-CPU), at least one of the slave-CPUs being a controlling slave-CPUs adapted to control an adjustable operational parameter of the slave transceiver that comprises the controlling slave-CPU;
b) receiving, within one of the plurality of slave transceivers, a reverse radio frequency (RF) telephone signal;
c) controlling, in the receiving slave transceiver, the adjustable operational parameter of the receiving slave transceiver in response to a characteristic of the reverse RF telephone signal; and
wherein at least one of the slave-CPUs is adapted to vary a size of a coverage area provided by an associated slave transceiver, and the at least one slave-CPU varies the size of the coverage area provided by the associated slave transceiver responsive to instructions received from one of the following:
the at least one slave-CPU associated with the slave transceiver independent of the master transceiver;
the at least one slave-CPU associated with the slave transceiver in combination with the master transceiver; and
the master transceiver independent of the at least one slave-CPU associated with the slave transceiver.

8. The method of claim 7, wherein the adjustable operation parameter is the gain of an amplifier within the slave transceiver.

9. The method of claim 7, further comprising;
a) generating an alternative frequency (AF) reverse slave telephone signal in the receiving slave transceiver in response to the reverse RF telephone signal;
b) receiving the AF reverse slave telephone signal in a master transceiver;
c) in the receiving master transceiver in which the reverse slave telephone signals were received, frequency converting the received AF reverse slave telephone signal to an RF reverse master telephone signal; and
d) conveying the reverse master telephone signal to a base station transceiver subsystem (BTS) external to the region.

10. The method of claim 9, further comprising;
a) conveying a setting signal from the receiving master transceiver to the receiving slave transceiver; and
b) in response to the conveyed setting signal, adjusting, at least one operational parameter of the receiving slave transceiver.

11. The method of claim 7, wherein the plurality of slave transceivers comprises at least one diversity transceiver and at least one main transceiver, the slave transceivers and the diversity transceiver being located such that the RF telephone signal received by the diversity transceivers is substantially different from the RF telephone signal received by the main transceivers.

12. The method of claim 7, further comprising:
a) receiving an instruction in a slave-CPUs from a management unit; and
b) in the receiving slave-CPU, setting at least one adjustable operational parameter of the slave transceivers comprising the receiving slave-CPU to initial values in response to the received instruction.

13. The method of claim 12, and comprising:
a) receiving in the forward master RF telephone signals from the BTS;
b) generating forward master AF telephone signals in response to the received forward master RF telephone signals;
c) conveying the forward master telephone signals to the plurality of slave transceivers;
d) in the plurality of slave transceivers, receiving the forward master AF telephone signals;
e) in the plurality of slave transceivers, generating forward slave RF telephone signals in response to the received forward master AF telephone signals;
f) monitoring The corresponding forward slave RF telephone signals in each of the slave transceivers; and
g) varying at least one of the operational parameters of each of the slave transceivers from their initial values, in response to the forward slave RF telephone signals and reverse slave RF telephone signals.

14. The method of claim 13, wherein the master transceiver comprises a master-CPU which is adapted to monitor at least some of the slave-CPUs and, in response to the monitored slave-CPUs and in response to initial instructions received from the management unit, to vary at least one BTS communicating with the master transceiver and at least one channel parameter of the varied BTSs.

15. An apparatus for wireless cellular telephone communication, comprising:
a) a first plurality of slave transceivers which are spatially separated from one another within an enclosed region, each of which slave transceivers is adapted to receive a reverse radio frequency (RF) telephone signal generated by a mobile transceiver within the region and to process the RF telephone signal, based on at least one adjustable operational parameter, so as to generate a reverse slave telephone signal, each of the slave transceivers comprising an associated slave central processing unit (slave-CPU) which is adapted to control at least one of the adjustable operational parameters of the slave-CPU's associated slave transceiver in response to at least one characteristics of the reverse RF telephone signal;
b) a second plurality of master transceivers, which are coupled to receive and process the reverse slave telephone signals from the first plurality of slave transceivers so as to generate corresponding reverse master telephone signals, and to convey the reverse master telephone signals to a third plurality of base station transceiver subsystems (BTSs) external to the region, and which are adapted to convey setting signals to the first plurality of slave transceivers so as to set the adjustable operational parameters thereof; and wherein at least one of the slave-CPUs is adapted to vary a size of a coverage area provided by an associated slave transceiver, and the at least one slave-CPU varies the size of the coverage area provided by the associated slave transceiver responsive to instructions from received one of the following:

the at least one slave-CPU associated with the slave transceiver independent of the master transceiver;

the at least one slave-CPU associated with the slave transceiver in combination with the master transceiver; and the master transceiver independent of the at least one slave-CPU associated with the slave transceiver.

16. The apparatus of claim 15, wherein each of the master transceivers comprises a switch and a third plurality of gain elements and a master-CPU, wherein the master-CPU of each master transceiver is adapted to operate the switch and the third plurality of gain elements of the associated master transceiver so that the associated master transceiver communicates via the third plurality of gain elements with at least one of the third plurality of BTSs.

17. The apparatus of claim 16, wherein each of the master transceivers is adapted to adjust a bandwidth of at least some of the slave transceivers responsive to the number of BTSs being communicated with via the third plurality of gain elements.

* * * * *